O. ROGERS.
HOOF-PARERS.
No. 180,731. Patented Aug. 8, 1876.
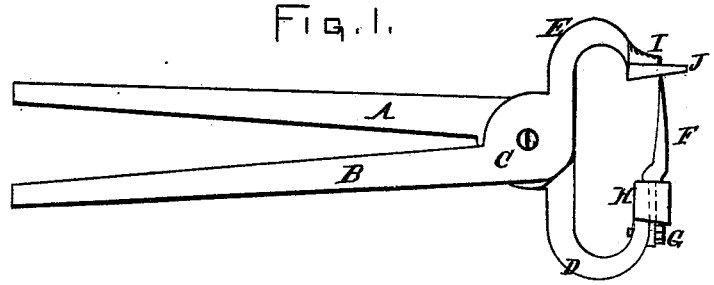
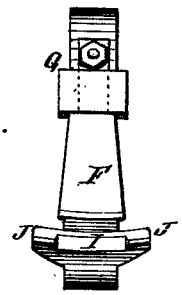
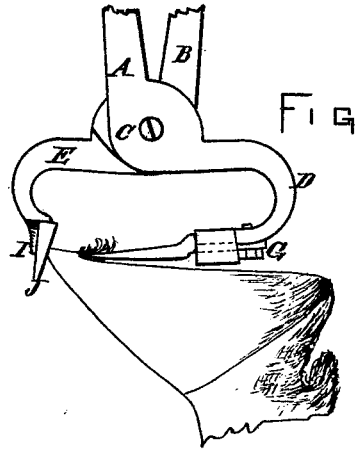
ATTEST:
O. H. Adix.
W. B. Whitney.
INVENTOR:
Oskar Rogers.
By G. L. Chapin
Atty

UNITED STATES PATENT OFFICE.

OSKER ROGERS, OF GREEN BAY, WISCONSIN.

IMPROVEMENT IN HOOF-PARERS.

Specification forming part of Letters Patent No. 180,731, dated August 8, 1876; application filed June 13, 1876.

*To all whom it may concern:*

Be it known that I, OSKER ROGERS, of Green Bay, in the county of Brown and State of Wisconsin, have invented a new and useful Improvement in Hoof-Trimmers, of which the following is a specification:

The object of the present invention is to provide more convenient means for paring or trimming horse's hoofs, preparatory to setting shoes.

The nature of the present invention consists in a die provided with two bearings—one at either side of the knife—between which and against the face of the die the knife passes, making a clean cut, and passing below the side bearings shearwise, instead of coming onto a block or anvil. Where a hoof is not level, as it generally is not, the two bearings prevent the device from turning sidewise, as is the case where a continuous anvil or bearing is used as a support against the hoof, and for the knife to operate against.

The advantage of this device is that all of the parings are cut wholly from the hoof, and the knife remains sharp for a much longer period of use than hoof-trimmers now known to the art. Further than this, the die is concave on its face, to correspond nearly to the curve of a hoof, so that the device is held to its work with but little labor.

In the drawings, Figure 1 is an elevation of my improved hoof-trimmer; Fig. 2, a view of the cutting end, with the knife raised a little above its bearing on the opposite jaw. Fig. 3 is a side view of the jaws and knife, in position as when trimming a hoof.

A represents a lever or handle, terminating in a jaw, D, and B is a lever or handle terminating in a jaw, E, the screw or rivet C connecting the parts, so that they may be opened and closed in the usual manner. To the jaw D is affixed a rounded-edged knife, F, by means of a sleeve, H, and set-screw G, the knife being removable for repairs. The jaw E is concave in form on the side presented to the knife F, to conform to the curve of a hoof, and at I is formed a die for the knife to bear against during the cutting process, and projecting out from this die, at the ends thereof, are ears J, which provide a support for the drawing cut of the knife F, when paring the hoof, the knife passing between the ears, while the latter hold the device firm.

The operation is simple, requiring only that the hoof be turned in the position shown in Fig. 3, and the ears J placed against it, and the levers worked by hand, so as to pare off or trim the hoof, also as shown.

I am aware that levers have been pivoted together, one of which has been provided with a knife, and the other provided with an anvil or resisting-surface, and that such devices have been used for trimming hoofs. I therefore confine my invention to the following claim.

I claim and desire to secure by Letters Patent—

A hoof-trimmer, one lever of which is provided with a round-edged knife, F, and the other lever provided with a die, I, which is concave on the side, coming against a hoof, and with ears or bearings J arranged for the knife to pass between them, and pass the face of the die, as set forth.

OSKER ROGERS.

Witnesses:
J. H. M. WIGMAN,
WM. HOLZKNECHT.